US009621796B2

United States Patent
Muukki et al.

(10) Patent No.: US 9,621,796 B2
(45) Date of Patent: Apr. 11, 2017

(54) METHOD, APPARATUS AND COMPUTER PROGRAM FOR CAPTURING IMAGES WITH MULTIPLE IMAGE CAPTURE AND IMAGE MODIFICATION

(75) Inventors: Mikko Muukki, Tampere (FI); Tomi Sokeila, Tampere (FI); Juuso Gren, Kyrokoski (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/383,130

(22) PCT Filed: Mar. 15, 2012

(86) PCT No.: PCT/IB2012/051249
§ 371 (c)(1),
(2), (4) Date: Sep. 5, 2014

(87) PCT Pub. No.: WO2013/136134
PCT Pub. Date: Sep. 19, 2013

(65) Prior Publication Data
US 2015/0015736 A1    Jan. 15, 2015

(51) Int. Cl.
*H04N 5/235* (2006.01)
*H04N 5/232* (2006.01)
*H04N 5/355* (2011.01)

(52) U.S. Cl.
CPC ....... *H04N 5/23222* (2013.01); *H04N 5/2354* (2013.01); *H04N 5/2355* (2013.01); *H04N 5/23232* (2013.01); *H04N 5/35581* (2013.01)

(58) Field of Classification Search
CPC ........................... H04N 5/2356; H04N 5/2625
(Continued)

(56) References Cited

U.S. PATENT DOCUMENTS 7,133,070 B2   11/2006   Wheeler et al. ........... 348/223.1
7,184,590 B2    2/2007   Lee .............................. 382/181
(Continued)

FOREIGN PATENT DOCUMENTS

EP    1 292 106 A2    3/2003
EP    1 950 704 A2    7/2008
(Continued)

OTHER PUBLICATIONS

Gelfand, Natasha, et al., "Multi-exposure Imaging on Mobile Devices", © 2010 ACM, Jun. 10, 2010, 4 pgs.
(Continued)

*Primary Examiner* — Chia-Wei A Chen
(74) *Attorney, Agent, or Firm* — Harrington & Smith

(57) ABSTRACT

The Figures illustrate an apparatus, method, computer program and apparatus wherein the method includes detecting an input; and in response to detecting the input, causing an image capturing apparatus to capture a plurality of images; wherein the image capturing apparatus is configured to have a first set of parameters to capture a first subset of the plurality of images such that the first subset of the plurality of images are configured for use with a first image processing algorithm and the image capturing apparatus is configured to have a second set of parameters to capture a second subset of the plurality of images such that the second subset of the plurality of images are configured for use with a second image processing algorithm.

18 Claims, 4 Drawing Sheets

(58) Field of Classification Search
USPC .................................................... 348/222.1
See application file for complete search history.

(56) References Cited

U.S. PATENT DOCUMENTS

| | | | |
|---|---|---|---|
| 7,358,988 B1 | 4/2008 | Konishi et al. ............. | 348/222.1 |
| 7,962,033 B2 | 6/2011 | Georgiev et al. ............. | 396/332 |
| 2003/0122952 A1* | 7/2003 | Kuroiwa ............... | H04N 1/2112 |
| | | | 348/333.11 |
| 2006/0012690 A1 | 1/2006 | Nakamura et al. ........ | 348/231.6 |
| 2006/0125919 A1* | 6/2006 | Camilleri ................... | B60R 1/00 |
| | | | 348/148 |
| 2006/0181614 A1 | 8/2006 | Yen et al. ................... | 348/222.1 |
| 2007/0058064 A1 | 3/2007 | Hara et al. ............... | 348/333.01 |
| 2009/0153737 A1 | 6/2009 | Glen ............................ | 348/571 |
| 2010/0046842 A1* | 2/2010 | Conwell ........... | G06F 17/30265 |
| | | | 382/218 |
| 2010/0150473 A1* | 6/2010 | Kwon ....................... | G06T 5/50 |
| | | | 382/284 |
| 2010/0265313 A1 | 10/2010 | Liu et al. ......................... | 348/36 |
| 2010/0321539 A1* | 12/2010 | Ito ...................... | H04N 5/23206 |
| | | | 348/241 |
| 2011/0028183 A1* | 2/2011 | Yun, II .................. | G06T 7/0073 |
| | | | 455/556.1 |
| 2011/0080487 A1* | 4/2011 | Venkataraman ..... | H04N 5/2253 |
| | | | 348/218.1 |
| 2011/0109754 A1* | 5/2011 | Matsunaga ............ | H04N 5/235 |
| | | | 348/208.4 |
| 2011/0221916 A1* | 9/2011 | Kuriyama .......... | H04N 5/23216 |
| | | | 348/220.1 |

FOREIGN PATENT DOCUMENTS

| | | |
|---|---|---|
| WO | WO 2009/097552 A1 | 8/2009 |
| WO | WO 2012/177149 A1 | 12/2012 |

OTHER PUBLICATIONS

Oldridge, Steve, et al., "Mapping the Problem Space of Image Registration", 2011, Human Communication Technologies Laboratory ECE, University of British Columbia, Vancouver, Canada, 7 pgs.

* cited by examiner

METHOD, APPARATUS AND COMPUTER PROGRAM FOR CAPTURING IMAGES WITH MULTIPLE IMAGE CAPTURE AND IMAGE MODIFICATION

TECHNOLOGICAL FIELD

Embodiments of the present invention relate to a method, apparatus and computer program for capturing images. In particular, they relate to a method, apparatus and computer program for capturing images which may be used with an image processing algorithm.

BACKGROUND

Apparatus which enable a user to capture images such as digital cameras are known. Such apparatus may enable a user to select image processing algorithms to enable high quality images to be obtained in different lighting and imaging conditions. Such algorithms may comprise, for example, high dynamic range (HDR) algorithms or flash-no-flash algorithms. Some of these algorithms may require a plurality of images to be captured. The plurality of images may then be combined to provide a single image with modified image properties.

Such apparatus require a user to select which algorithm to use before the image is captured. This may make such apparatus more difficult for a user to use as, in order to obtain a high quality image, the user may need to understand a plurality of different types of algorithms which may be available as well as understand the effects that different imaging conditions, such as light levels and movement, would have on these algorithms.

It may be beneficial to provide an apparatus for capturing images which is simpler for a user to use.

BRIEF SUMMARY

According to various, but not necessarily all, embodiments of the disclosure there is provided a method comprising; detecting an input; and in response to detecting the input, causing an image capturing apparatus to capture a plurality of images; wherein the image capturing apparatus is configured to have a first set of parameters to capture a first subset of the plurality of images such that the first subset of the plurality of images are configured for use with a first image processing algorithm and the image capturing apparatus is configured to have a second set of parameters to capture a second subset of the plurality of images such that the second subset of the plurality of images are configured for use with a second image processing algorithm.

In some embodiments the image capturing apparatus may be configured to capture more than two subsets of images where for each of the subsets of images the image capturing apparatus is configured to have a different set of parameters to enable each of the subsets of images to be used with a different image processing algorithm.

In some embodiments the subsets of images may be captured in a sequence where the order of the sequence is determined by the image processing algorithms associated with each subset of images. The sequence in which the images are captured may be determined by a user input. The sequence in which the images are captured may be determined by a detected physical condition. The detected physical condition may comprise a physical condition of the image capturing apparatus. The detected physical condition may comprise at least one of a distance to an object to be imaged, motion of the image capturing apparatus. The detected physical condition may comprise a physical condition of an object to be imaged. The detected physical condition may comprise at least one of lux level, contrast of a scene to be imaged, dimensions of object, type of object, motion of the object.

In some embodiments of the disclosure the detected input may comprise a user input.

In some embodiments of the disclosure the detected input may comprise a user selecting at least one image processing algorithm.

In some embodiments of the disclosure the method may further comprise storing the plurality of images such that the image processing algorithms may be performed on the stored images.

In some embodiments of the disclosure the image processing algorithms may be performed in response to a user input.

In some embodiments of the disclosure the image processing algorithms may be performed automatically.

According to various, but not necessarily all, embodiments of the disclosure there is provided an apparatus comprising: at least one processor; and at least one memory including computer program code; wherein the at least one memory and the computer program code are configured to, with the at least one processor, enable the apparatus to: detect an input; and in response to detecting the input, cause an image capturing apparatus to capture a plurality of images; wherein the image capturing apparatus is configured to have a first set of parameters to capture a first subset of the plurality of images such that the first subset of the plurality of images are configured for use with a first image processing algorithm and the image capturing apparatus is configured to have a second set of parameters to capture a second subset of the plurality of images such that the second subset of the plurality of images are configured for use with a second image processing algorithm.

In some embodiments the image capturing apparatus may be configured to capture more than two subsets of images where for each of the subsets of images the image capturing apparatus is configured to have a different set of parameters to enable each of the subsets of images to be used with a different image processing algorithm. The image capturing apparatus may be configured to capture the subsets of images in a sequence where the order of the sequence is determined by the image processing algorithms associated with each subset of images. In some embodiments the sequence in which the images are captured may be determined by a user input. The sequence in which the images are captured may be determined by a detected physical condition. The detected physical condition may comprise a physical condition of the image capturing apparatus. The detected physical condition may comprise at least one of a distance to an object to be imaged, motion of the image capturing apparatus. The detected physical condition may comprise a physical condition of an object to be imaged. The detected physical condition may comprise at least one of lux level, contrast of a scene to be imaged, dimensions of object, type of object, motion of the object.

In some embodiments the detected input may comprise a user input. The detected input may comprises a user selecting at least one image processing algorithm.

In some embodiments the at least one memory and the computer program code may be further configured to, with the at least one processor, enable the apparatus to store the plurality of images such that the image processing algorithms may be performed on the stored images.

In some embodiments the at least one memory and the computer program code may be further configured to, with the at least one processor, enable the apparatus to perform the image processing algorithms in response to a user input.

In some embodiments the at least one memory and the computer program code may be further configured to, with the at least one processor, enable the apparatus to perform the image processing algorithms automatically.

According to various, but not necessarily all, embodiments of the disclosure there is provided a computer program comprising computer program instructions that, when executed by at least one processor, enable an apparatus at least to perform: detecting an input; and in response to detecting the input, causing an image capturing apparatus to capture a plurality of images; wherein the image capturing apparatus is configured to have a first set of parameters to capture a first subset of the plurality of images such that the first subset of the plurality of images are configured for use with a first image processing algorithm and the image capturing apparatus is configured to have a second set of parameters to capture a second subset of the plurality of images such that the second subset of the plurality of images are configured for use with a second image processing algorithm.

In some embodiments the computer program may comprise program instructions for causing a computer to perform any of the methods described above.

In some embodiments there may be provided a physical entity embodying the computer program as described above.

In some embodiments there may be provided an electromagnetic carrier signal carrying the computer program as described above.

The apparatus may be for capturing images.

BRIEF DESCRIPTION

For a better understanding of various examples of embodiments of the present disclosure reference will now be made by way of example only to the accompanying drawings in which:

FIG. 1 schematically illustrates an apparatus according to an exemplary embodiment of the disclosure;

DETAILED DESCRIPTION

Figure 1:
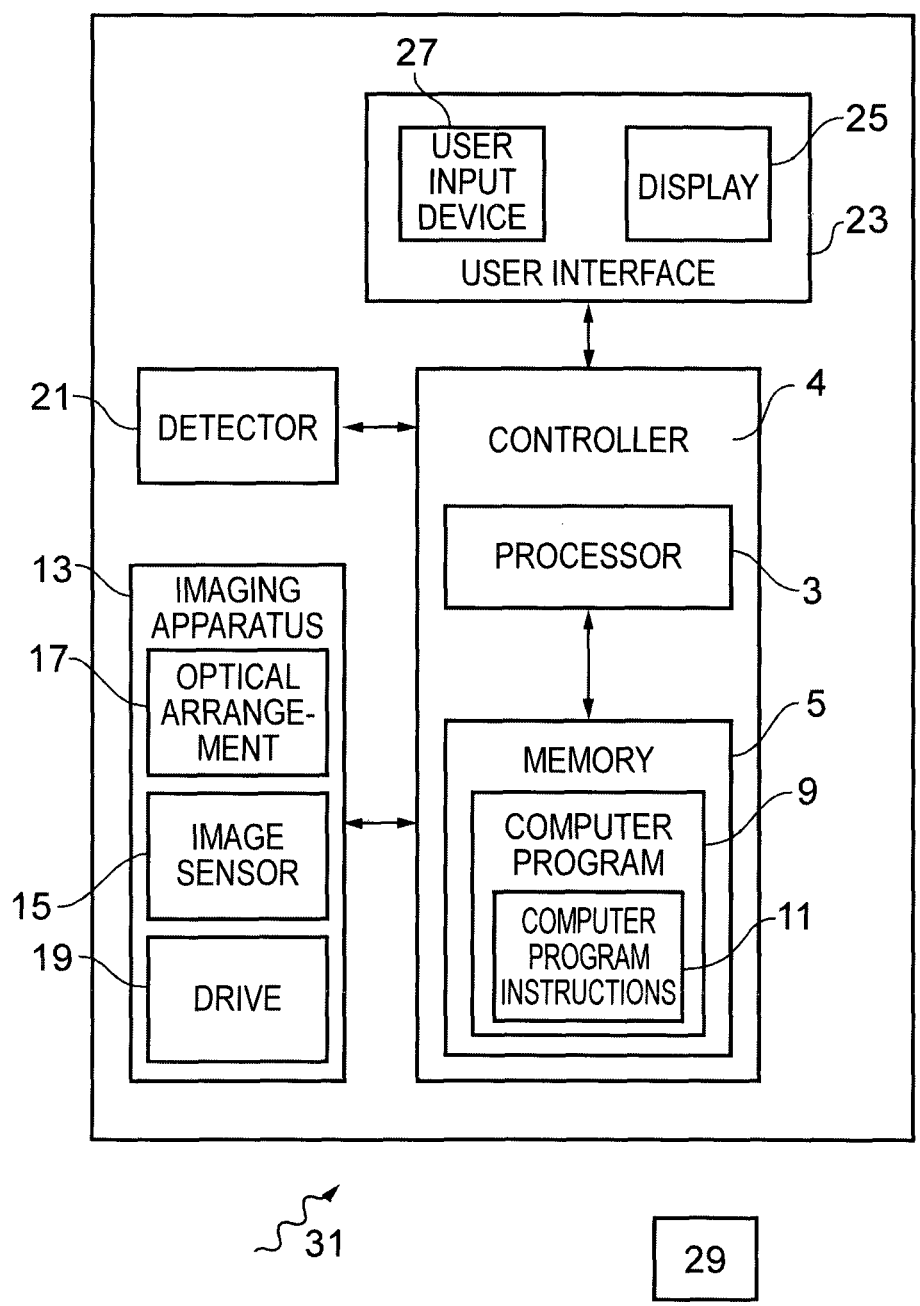

The Figures illustrate an apparatus 1, method, computer program 9 and apparatus 1 wherein the method comprises detecting 41, 51 an input; and in response to detecting 41, 51 the input, causing 43, 55 an image capturing apparatus 13 to capture a plurality of images; wherein the image capturing apparatus 13 is configured to have a first set of parameters to capture a first subset of the plurality of images such that the first subset of the plurality of images are configured for use with a first image processing algorithm and the image capturing apparatus 13 is configured to have a second set of parameters to capture a second subset of the plurality of images such that the second subset of the plurality of images are configured for use with a second image processing algorithm.

FIG. 1 schematically illustrates an apparatus 1 according to an exemplary embodiment of the invention. The apparatus 1 may be an electronic apparatus which is configured to enable images to be captured. The apparatus 1 may be, for example, a camera, a mobile cellular telephone, a personal computer or any other apparatus which may be configured to enable images to be captured. The apparatus 1 may be a handheld apparatus 1 which can be carried in a user's hand, handbag or pocket of their clothing for example.

Only features referred to in the following description are illustrated in FIG. 1. However, it should be appreciated that the apparatus 1 may comprise additional features that are not illustrated. For example, in embodiments of the invention where the apparatus 1 is a mobile cellular telephone, the apparatus 1 may also comprise a transmitter and receiver configured to enable wireless communication.

The apparatus 1 schematically illustrated in FIG. 1 comprises: a controller 4, an image capturing apparatus 13, at least one detector 21 and a user interface 23. The controller 4, image capturing apparatus 13, detector 21 and user interface 23 are operationally coupled. It is to be appreciated that any number or combination of intervening elements may be provided between the respective components of the apparatus 1 including no intervening elements. The controller 4, image capturing apparatus 13, detector 21 and user interface 23 may be located within a housing.

In the illustrated embodiment the controller 4 comprises at least one processor 3 and at least one memory 5. The controller 4 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 29 (e.g. disk, memory etc) to be executed by such processors 3.

The controller 4 may be configured to control the apparatus 1 to perform a plurality of different functions. For example the controller 4 may be configured to control the apparatus 1 to capture and store images. In some embodiments of the disclosure the controller 4 may also be configured to perform image processing on the captured images.

The controller 4 may also be configured to enable the apparatus 1 to detect 41, 51 an input; and in response to detecting 41, 51 the input, cause 43, 55 the image capturing apparatus 13 to capture a plurality of images; wherein the image capturing apparatus 13 is configured to have a first set of parameters to capture a first subset of the plurality of images such that the first subset of the plurality of images are configured for use with a first image processing algorithm and the image capturing apparatus 13 is configured to have a second set of parameters to capture a second subset of the plurality of images such that the second subset of the plurality of images are configured for use with a second image processing algorithm.

The at least one processor 3 may be configured to receive input commands from the user interface 23, the image capturing apparatus 13 and the detector 21. The at least one processor may also be configured to provide output commands to the user interface 23, the image capturing apparatus 13 and the detector 21. The at least one processor 3 is also configured to write to and read from the at least one memory 5.

In the exemplary embodiment illustrated in FIG. 1 the image capturing apparatus 13 comprises an optical arrangement 17 and an image sensor 15. In some embodiments of the disclosure the image capturing apparatus 13 may also comprise one or more drives 19.

The image sensor 15 may comprise any means which is configured to convert light incident on the image sensor 15 into an electrical signal to enable an image to be produced. The image sensor 15 may comprise, for example, a digital image sensor such as a charge-coupled-device (CCD) or a complementary metal-oxide-semiconductor (CMOS). The at least one processor 3 may be configured to receive inputs from the image sensor 15. For example, the at least one processor 3 may be configured to retrieve an electrical signal comprising image data from the image sensor 15 and store it in the at least one memory 5. The image data may be in the form of a still image or a video image The optical arrangement 17 may comprise any means configured to focus or deflect incident light from an object onto the image sensor 15. The optical arrangement 17 may receive the incident light from an object or scene external to the apparatus 1 through an aperture in a housing of the apparatus 1. The optical arrangement 17 may comprise, for example, one or more optical devices such as one or more lenses.

In some exemplary embodiments of the disclosure the apparatus 1 may also comprise one or more drives 19. The one or more drives 19 may comprise any means which enables movement of at least part of the optical arrangement 17 relative to the image sensor 15. In some exemplary embodiments of the disclosure the one or more drives 19 may comprise an electric motor. In embodiments of the disclosure, where the optical arrangement 17 comprises a plurality of components, the one or more drives may enable movement of some or all of the plurality of components.

The apparatus 1 may also comprise one or more detectors 21. The detectors 21 may comprise any means which may be configured to detect a physical condition and provide an input to the controller 4 indicative of the detected condition.

In some embodiments of the disclosure the one or more detectors 21 may comprise detectors configured to detect a physical condition of the apparatus 1 or image capturing apparatus 13. For example the physical condition may comprise motion of the apparatus 1 or image capturing apparatus 13. In such embodiments the detector 21 may comprise any suitable means for detecting motion of apparatus 1 or image capturing apparatus 13 such as one or more accelerometers and/or a gyroscope.

In other embodiments the detected physical condition may comprise the distance between the apparatus 1 and an object which is to be imaged. In such embodiments the at least one detector 21 may comprise a detector for detecting a reflected signal such as an ultra-sound or infra red signal or any other suitable detectors.

In some embodiments of the disclosure the one or more detectors 21 may comprise detectors configured to detect a physical condition of the scene or object to be imaged. For example, the one or more detectors 21 may be configured to detect the lux level, the contrast of a scene, the dimensions of an object, the type of object to be imaged or motion of the object or any other suitable physical condition. In such embodiments the at least one detector 21 may comprise a light level sensor, means for detecting a reflected signal such as an ultra-sound or infra red signal or any other suitable detectors.

In the exemplary embodiment illustrated in FIG. 1 the user interface 23 comprises a user input device 27 and a display 25.

The user input device 27 may comprise any means which enables a user input to be detected. The detection of a user input may enable the user of the apparatus 1 to input information which may be used to control the apparatus 1. For example the user input device 27 may enable a user to make an input indicating that an image should be captured by the image capturing apparatus 13. In some embodiments of the disclosure the user input device 27 may also enable the user to make a user input selecting one or more imaging processing algorithms which should be used to process the captured images. The user input device 27 may comprise a touch sensitive display, a keypad or a combination of a number of different types of user input devices.

The display 25 may comprise any means which enables information to be displayed to a user of the apparatus 1. The information displayed on the display 25 may comprise images which have been captured by the image capturing apparatus 13. The information displayed on the display 25 may comprise images which have been stored in the one or more memories 5.

The at least one memory 5 may be configured to store a computer program code 9 comprising computer program instructions 11 that control the operation of the apparatus 1 when loaded into the at least one processor 3. The computer program instructions 11 provide the logic and routines that enable the apparatus 1 to perform the methods illustrated in FIGS. 3 and 4. The at least one processor 3 by reading the at least one memory 5 is able to load and execute the computer program 9.

The computer program instructions 11 may provide computer readable program means configured to control the apparatus 1. The program instructions 11 may provide, when loaded into the controller 4; means for detecting 41, 51 an input; and means for causing 43, 55, in response to detecting 41, 51 the input, an image capturing apparatus 13 to capture a plurality of images; wherein the image capturing apparatus 13 is configured to have a first set of parameters to capture a first subset of the plurality of images such that the first subset of the plurality of images are configured for use with a first image processing algorithm and the image capturing apparatus 13 is configured to have a second set of parameters to capture a second subset of the plurality of images such that the second subset of the plurality of images are configured for use with a second image processing algorithm.

The computer program 9 may arrive at the apparatus 1 via any suitable delivery mechanism 31. The delivery mechanism 31 may be, for example, a computer-readable storage medium, a computer program product 29, a memory device, a record medium such as a CD-ROM or DVD, an article of manufacture that tangibly embodies the computer program 9. The delivery mechanism may be a signal configured to reliably transfer the computer program 9. The apparatus 1 may propagate or transmit the computer program 9 as a computer data signal.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application integration specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 2:
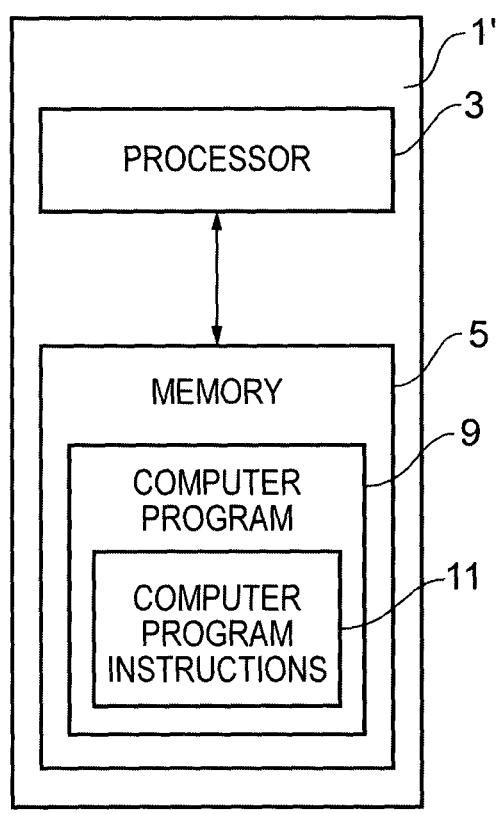
FIG. 2 illustrates a touch sensitive display configured to provide a tactile indication according to a second exemplary embodiment of the disclosure.

FIG. 2 illustrates an apparatus 1' according to another embodiment of the invention. The apparatus 1' illustrated in FIG. 2 may be a chip or a chip-set. The apparatus 1' comprises at least one processor 2 and at least one memory 5 as described above in relation to FIG. 1.

Figure 3:
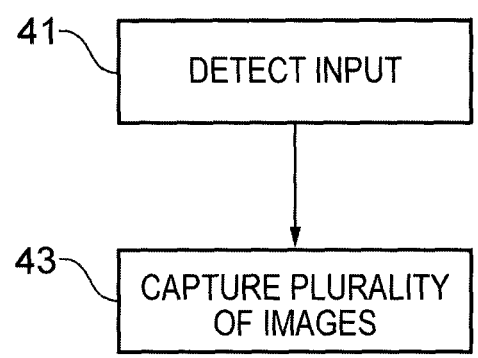
FIG. 3 is a block diagram which schematically illustrates a method according to an exemplary embodiment of the disclosure.
Figure 4:
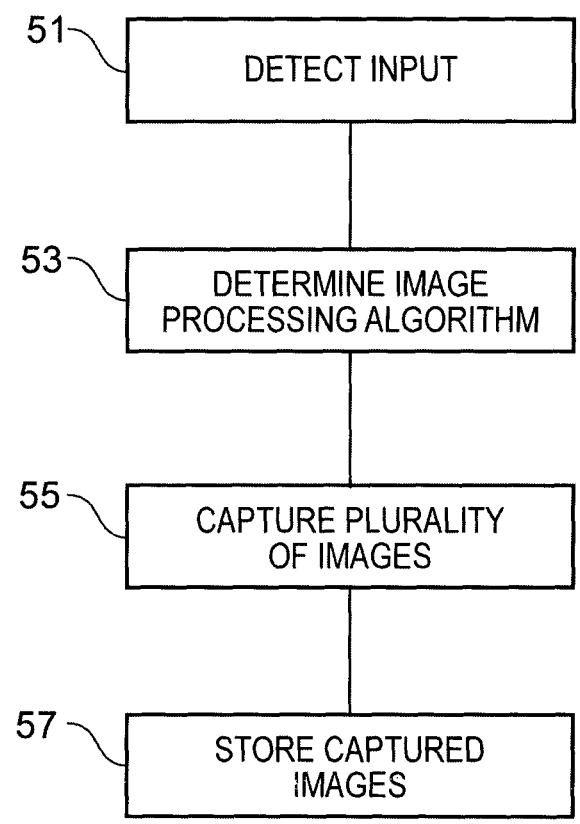
FIG. 4 is a block diagram which schematically illustrates a method according to another exemplary embodiment of the disclosure.

FIGS. 3 and 4 schematically illustrate methods according to embodiments of the disclosure. The embodiments may be implemented using the apparatus 1, 1' of FIGS. 1 and 2.

At block 41 of the exemplary method illustrated in FIG. 3 an input is detected. The input may comprise any external event which may be detected by the apparatus 1. In some embodiments of the disclosure the input may comprise a user input. In such embodiments the user input may be detected using the user input device 27 of the exemplary apparatus 1 illustrated in FIG. 1.

The user input which is detected at block 41 may comprise an indication from the user that they would like an image to be captured. In some embodiments of the disclosure the user input which is detected at block 41 may comprise a user selection of an imaging processing algorithm which is to be used on the images captured in response to the input.

At block 43, in response to the detection of the input at block 41, a plurality of images are captured. The plurality of images may be captured using the image capturing apparatus 13 as described above in relation to FIG. 1.

In the exemplary embodiment of the disclosure the plurality of images captured at block 43 comprises a plurality of subsets of images. For example, the plurality of images captured may comprise a first subset of images and a second subset of images. Each of the subset of images may comprise one or more images. It is to be appreciated that any number of subsets of images may be captured. It also to be appreciated that each of the subsets of images may comprise any number of individual images.

In some embodiments of the disclosure each of the subsets of images may be distinct so that there is no overlap between the different subsets of images. In such embodiments each image which is captured is only a member of one subset of images. In other embodiments of the disclosure there may be some overlap between the different subsets of images. In such embodiments an image which is captured may be a member of more than one subset of images. Therefore, in some embodiments of the disclosure some of the subsets of images may share one or more common images.

In exemplary embodiments of the disclosure the subsets of images which are captured may be associated with different image processing algorithms. The image capturing apparatus 13 may capture the images such that the captured images are suitable for use with different image processing algorithms. This may enable different image processing algorithms to be used on the different subsets of images. In exemplary embodiments of the disclosure where the detected input comprises a user input, at least one of the image processing algorithms which is associated with a subset of images may comprise an algorithm which has been selected by the user of the apparatus 1.

As mentioned above, in some embodiments of the disclosure, some of the subsets of images may share one or more common images. In such embodiments a single image may be associated with different image processing algorithms.

The image processing algorithms may comprise any algorithms which may be used to modify the images captured by the image sensor 15. In some embodiments of the disclosure the image processing algorithms may comprise algorithms which combine a plurality of different images. Therefore these algorithms may require a plurality of images to be captured. The plurality of different images may be captured simultaneously using different imaging sensors 15 or sequentially over a short period of time so that the images are of the same scene or object.

Image processing algorithms which may be used in exemplary embodiments of the disclosure may comprise high dynamic range (HDR) algorithms, flash-no-flash algorithms, bracketing algorithms such as focus bracketing, multiframe noise filtering, super-resolution, panoramic imaging algorithms, night time imaging algorithms aperture bracketing or any other suitable image processing algorithms.

In the exemplary embodiments of the disclosure the image capturing apparatus 13 may be configured to have a first set of parameters to capture a first subset of the plurality of images and the image capturing apparatus 13 may be configured to have a second set of parameters to capture a second subset of the plurality of images. In some embodiments of the disclosure each image may be captured with the image capturing apparatus 13 in a different configuration. A single image may be part of more than one subset and so may be used with more than one different image processing algorithm.

The parameters of the image capturing apparatus 13 may comprise any physical characteristic of the image capturing apparatus 13 which may affect the properties of the images provided by the image sensor 15. For example, in some embodiments of the disclosure the parameters may comprise, the exposure time, the size of the aperture, the focal length of the optical arrangement 17, the relative distance between the optical arrangement 17 and the image sensor 15 whether or not flash is used and variation in gain or any other suitable parameter. The parameters of the imaging apparatus 13 may affect properties of the images provided by the image sensor 15 such as the resolution of the image, the contrast of the image, which portions within the image are in focus or any other suitable property. Where the parameter comprises the relative distance between the optical arrangement 17 and the image sensor 15 this may be varied using the one or more drives 19.

The parameters of imaging apparatus 13 may be controlled so that the images which are captured are suitable for use with the image processing algorithms. For example, when capturing the first subset of the plurality of images the image processing apparatus 13 may be configured to have a first set of parameters such that the images produced by the image sensor 15 are suitable for use with an algorithm associated with the first subset of images. Similarly, when capturing the second subset of the plurality of images the image processing apparatus 13 may be configured to have a second set of parameters such that the images produced by the image sensor 15 are suitable for use with an algorithm associated with the second subset of images. In some embodiments of the disclosure the image processing apparatus 13 may be configured to have a different set of parameters for each subset of images which may enable each subset of captured images to be used with a different image processing algorithm.

In some embodiments of the disclosure the images within the subsets of images may be captured using different parameters of the image capturing apparatus 13. For example, where a subset of images comprises a plurality of images each image within the subset of images may be captured with the image capturing apparatus 13 having a different set of parameters. For instance, where the image processing algorithm comprises a flash no flash algorithm the subset of images may comprise at least two images. When a first image is captured the image capturing apparatus 13 may be configured to provide a flash and when a second image is captured the image capturing apparatus 13 may be configured to provide no flash.

Similarly where the image processing algorithm comprises a HDR algorithm the subset of images may comprise a plurality of images where each of the images has a different exposure value. When a first image is captured the image capturing apparatus 13 may be configured to have a first exposure time and aperture size. When a second image is captured the image capturing apparatus 13 may be configured to have a second exposure time and aperture size which may be different to the first exposure time and aperture size.

It is to be appreciated that more than two subsets of images may be captured. Each of the subsets of images may be associated with a different processing algorithm so that for each of the subsets of images the image capturing apparatus 13 has a different set of parameters.

In embodiments of the disclosure where the method is implemented using the apparatus 1 of FIGS. 1 and 2 the at least one memory 5 may store computer code which enables the image capturing apparatus 13 to be configured to have the parameters needed to capture images for use with the available algorithms. Configuring the image capturing apparatus 13 to have different parameters may comprise using the drive 19 to move the optical arrangement 17 relative to the image sensor 15, varying the exposure time used, varying the aperture available or any other suitable change in parameters. The at least one memory 5 may also store computer code which enables the available algorithms to be implemented on the plurality of captured images.

FIG. 4 illustrates a method according to another embodiment of the disclosure which may also be implemented using an apparatus 1, 1' as illustrated in FIGS. 1 and 2 and as described above.

At block 51 of the method illustrated in FIG. 4 an input is detected. As described above in relation to FIG. 3 the detected input may comprise a user input. For example the user input may be detected using the user input device 17 of the exemplary apparatus illustrated in FIG. 1. The user input which is detected may comprise an indication from the user that they would like an image to be captured. In some embodiments of the disclosure the user input may comprise a user selection of an imaging processing algorithm which is to be used on the captured images.

At block 53, in response to the detection of the input, a plurality of image processing algorithms which may be used may be determined. In some embodiments a plurality of image processing algorithms may be available to be used on images captured by the image capturing apparatus 1. In such embodiments the method may comprise determining which algorithms are likely to provide the best images and selecting these algorithms from the plurality of algorithms available.

The image processing algorithms which are selected to be used may be determined using the detected input. For example, the detected input may comprise user selection of an algorithm. In such embodiments the image processing algorithms selected at block 53 may comprise at least the image processing algorithm selected by the user.

In some exemplary embodiments the plurality of image processing algorithms selected at block 53 may also include image processing algorithms which have not been selected by the user. In such embodiments the automatically selected image processing algorithms may be selected based on detected physical conditions. In some embodiments the physical conditions may be determined by image analysis.

In some embodiments of the disclosure the at least one detector 21, as described above in relation to FIG. 1 may be used to detect the physical conditions.

In some exemplary embodiments of the disclosure the detected physical condition may comprise a physical condition of the image capturing apparatus. In such exemplary embodiments the detected physical condition may comprise a physical condition such as a distance to an object to be imaged, motion of the image capturing apparatus or any other suitable physical condition.

In some exemplary embodiments of the disclosure the detected physical condition may comprise a physical condition of an object to be imaged. In such exemplary embodiments the detected physical condition may comprise a physical condition such as lux level, contrast of a scene to be imaged, dimensions of object, type of object, motion of the object or any other suitable physical condition.

For example, in some embodiments of the disclosure the distance between the image capturing apparatus 13 and the object to be imaged may be used to select whether or not it is appropriate to use a flash to capture the images and so determine which image processing algorithms may be appropriate to use.

In another example, it may be determined that a face or other type of object is to be imaged. This may be determined, for example, by performing image analysis. In such case the image processing algorithms which are selected may be suitable for providing high quality reproductions of the face or other type of object.

The image processing algorithms which are selected may require a plurality of different images or subsets of images to be captured. In some exemplary embodiments the method may also comprise, at block 53 determining the sequence in which the plurality of images are to be captured. The sequence in which the plurality of images are to be captured may be determined automatically without any further input from the user of the apparatus 1. The physical conditions which may have been detected by the at least one detector 21 may be used to determine the sequence in which the subsets of images are to be captured.

The subsets of images may be prioritised such that the subsets of images associated with image processing algorithms which have been selected by a user may be captured first or with a higher priority. The image processing algorithms which are selected automatically may be automatically prioritized. The automatic prioritization may be based on detected physical conditions. The automatic prioritization may determine which image processing algorithms are likely to give the highest quality images and give these a higher priority than other image processing algorithms. The subsets of images to be captured which are associated with the highest priority image processing algorithms may then be given a higher priority than the subsets of images to be captured which are associated with the lower priority image processing algorithms. The subsets of images may then be captured in order of the determined priority.

In some embodiments of the disclosure the subsets of images may be prioritized so that each subset of images is captured sequentially. In such embodiments all of the images associated with a first subset of images are captured, followed by all of the images of a second subset and then all of the images for a further subset. In other embodiments the images may be prioritized so that some images for a second subset images may be captured before all of the images associated with a first subset of images is captured. This allows for prioritization of images rather than subsets of images.

At block 55 of the method of FIG. 4 the plurality of images are captured. The at least one processor 3 may provide control signals to the image capturing apparatus 13 to enable the plurality of images to be captured in the sequence determined at block 43. The plurality of images may be captured as described above in relation to block 43 of FIG. 3.

An example of the logic which may be used to determine which image processing algorithms should be used and how the image capturing apparatus 13 needs to be configured may be as follows:

If flash is proposed (for example, by user selection), images for use with flash-no-flash algorithm are captured Elseif low light conditions are detected, images for use with multiframe noise filter algorithm are captured Elseif high contrast within the scene to be imaged is detected, images for use with HDR algorithm are captured Else images for use with super resolution algorithm (MM1) are captured.

It is to be appreciated that other logic and algorithms may be used in other implementations of the disclosure.

For instance in other exemplary embodiments of the disclosure the apparatus 1 may be used to capture images for a HDR algorithm and a flash-no-flash (FNF) image processing algorithm. Two images may be captured for the FNF algorithm and 3 images may be captured for the HDR algorithm. In such embodiments the images may be captured in the sequence HDR1, FNF1, HDR2, HDR3, FNF2 so that some of the images for the FNF algorithm are captured before all of the images are captured for the HDR image, even if the HDR algorithm has been assigned a higher priority.

In some embodiments some of the images used for the FNF algorithm and the HDR algorithm may be the same. In such embodiments the sequence of images used may comprise FNF1, COMMON, HDR2, HDR3. In this exemplary embodiment the FNF2 and HDR1 image are the same. It is to be appreciated that in other implementations other images could be the common images.

At block 57 the plurality of captured images may be stored in the one or more memories 5. The plurality of captured images may be stored in the one or more memories 5 so as to enable the plurality of image processing algorithms selected at block 53 to be performed on the captured images.

In some embodiments of the disclosure the image processing of the stored images may occur automatically without any further user input. The user may then be provided with processed images on the display 25. The user may then be able to select between the automatically processed images.

In some embodiments of the disclosure the image processing of the stored images may occur in response to a user input. For example the user may be informed which algorithms may be used on the subsets of the stored images and may be able to select the image processing algorithms which they would like to be carried out. The apparatus 1 may also be configured so that the user may also be able to select an image without performing any image processing on the images.

The image processing may be carried out by the apparatus 1. In some embodiments the captured images may be stored in the one or more memories so that the image processing may be carried out at a later date by a different apparatus.

Embodiments of the disclosure provide an apparatus which may be used to capture a plurality of images which enable a plurality of different image processing algorithms to be used. This means that a user does not need to know which image processing algorithms may give the best quality images as a plurality of different images may be captured automatically for use with a plurality of different image processing algorithms. This may enable the user to choose the image processing algorithm to be used after the images have been captured, which may make the apparatus 1 easier for a user to use to produce high quality images.

Also embodiments of the disclosure may enable a plurality of image processing algorithms to be selected based on detected physical conditions. This may enable different image processing algorithms to be selected for different physical conditions and so may enable higher quality images to be provided.

Also in the embodiments of the disclosure the sequence in which the plurality of images are captured may be determined automatically. This may enable the images most likely to provide a high quality image to be captured first and so may enable high quality images to be provided to the user of the apparatus 1 even if the user does not have very much understanding of the image processing algorithms or the imaging conditions.

The blocks illustrated in FIGS. 3 and 4 may represent steps in a method and/or sections of code in the computer program 9. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed. For example, in some embodiments of the disclosure an image which is captured may be a member of more than one subset of images. For example where the image processing algorithms to be used comprise auto focus bracketing, exposure bracketing and a saturation bracketing image processing algorithm one or more images could be included in each of the different subsets of images associated with each image processing algorithm.

In some embodiments of the disclosure when an image is captured meta data may be assigned to the image. The meta data may comprise information indicative of the image processing algorithm or algorithms associated with the image. The meta data may also comprise information indicative of the parameters of the image capturing apparatus used to capture the image. The meta data may comprise information which may enable a user to select which image processing algorithms to use. Such information may be particularly beneficial if the image processing is being carried out at a later date after the images were captured.

In some embodiments of the disclosure there may be additional processing performed on the image data in addition to the image processing algorithms. For example, the image data which is input into the image processing algorithm may comprise any suitable type of data such as Raw Bayer, Processed Bayer, YUV, RGB, JPG, non-bayer Raw or any other suitable type of data. Different image processing algorithms may use different types of input data format. For example, a flash-no-flash image processing algorithm may use input data in a bayer format and a high dynamic range algorithm may use input data in a YUV format.

In some embodiments of the disclosure more than one image processing algorithm may be applied to an image or subset of images. For example the output of a multiframe noise filter image processing algorithm may be used as an input for a high dynamic range image processing algorithm.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method comprising;
   detecting an input; and
   in response to detecting the input, causing an image capturing apparatus to capture a plurality of images; wherein
   the image capturing apparatus is configured to have a first set of parameters to capture a first subset of the plurality of images such that the first subset of the plurality of images are configured for use with a first image processing algorithm and the first image processing algorithm is used to modify images comprised in the first subset of the plurality of images, and the image capturing apparatus is configured to have a second set of parameters to capture a second subset of the plurality of images such that the second subset of the plurality of images are configured for use with a second image processing algorithm and the second image processing algorithm is used to modify images comprised in the second subset of the plurality of images: and
   wherein the subsets of images are captured in a sequence where the order of the sequence is determined by the image processing algorithms associated with each subset of images.

2. A method as claimed in claim 1 wherein the image capturing apparatus is configured to capture more than two subsets of images where for each of the subsets of images the image capturing apparatus is configured to have a different set of parameters to enable each of the subsets of images to be used with a different image processing algorithm.

3. A method as claimed in claim 1 wherein the sequence in which the images are captured is determined by a user input.

4. A method as claimed in claim 1 wherein the sequence in which the images are captured is determined by a detected physical condition.

5. A method as claimed in claim 4 wherein the detected physical condition comprises a physical condition of the image capturing apparatus.

6. A method as claimed in claim 5 wherein the detected physical condition comprises at least one of a distance to an object to be imaged, motion of the image capturing apparatus.

7. A method as claimed in claim 4 wherein the detected physical condition comprises a physical condition of an object to be imaged.

8. A method as claimed in claim 7 wherein the detected physical condition comprises at least one of lux level, contrast of a scene to be imaged, dimensions of object, type of object, motion of the object.

9. A method as claimed in claim 1 wherein the detected input comprises a user input.

10. A method as claimed in claim 9 wherein the detected input comprises a user selecting at least one image processing algorithm.

11. A method as claimed in claim 1 wherein the method further comprises storing the plurality of images such that the image processing algorithms may be performed on the stored images.

12. A method as claimed in claim 1 wherein the image processing algorithms are performed in response to a user input.

13. A method as claimed in claim 1 wherein the image processing algorithms are performed automatically.

14. An apparatus comprising:
    at least one processor; and
    at least one memory including computer program code; wherein the at least one memory and the computer program code are configured to, with the at least one processor, enable the apparatus to:
    detect an input; and
    in response to detecting the input, cause an image capturing apparatus to capture a plurality of images; wherein
    the image capturing apparatus is configured to have a first set of parameters to capture a first subset of the plurality of images such that the first subset of the plurality of images are configured for use with a first image processing algorithm and the first image processing algorithm is used to modify images comprised in the first subset of the plurality of images,
    and the image capturing apparatus is configured to have a second set of parameters to capture a second subset of the plurality of images such that the second subset of the plurality of images are configured for use with a second image processing algorithm and the second image processing algorithm is used to modify images comprised in the second subset of the plurality of images; and
    wherein the image capturing apparatus is configured to capture the subsets of images in a sequence where the order of the sequence is determined by the image processing algorithms associated with each subset of images.

15. An apparatus as claimed in claim 14 wherein the image capturing apparatus is configured to capture more than two subsets of images where for each of the subsets of images the image capturing apparatus is configured to have a different set of parameters to enable each of the subsets of images to be used with a different image processing algorithm.

16. An apparatus as claimed in claim 14 wherein the sequence in which the images are captured is determined by a user input.

17. An apparatus as claimed in claim 14 wherein the sequence in which the images are captured is determined by a detected physical condition.

18. A non-transitory physical entity embodying computer program comprising computer program instructions that, when executed by at least one processor, enable an apparatus at least to perform:
   detecting an input; and
   in response to detecting the input, causing an image capturing apparatus to capture a plurality of images; wherein
   the image capturing apparatus is configured to have a first set of parameters to capture a first subset of the plurality of images such that the first subset of the plurality of images are configured for use with a first image processing algorithm and the first image processing algorithm is used to modify images comprised in the first subset of the plurality of images,
   and the image capturing apparatus is configured to have a second set of parameters to capture a second subset of the plurality of images such that the second subset of the plurality of images are configured for use with a second image processing algorithm and the second image processing algorithm is used to modify images comprised in the second subset of the plurality of images; and
   wherein the image capturing apparatus is configured to capture the subsets of images in a sequence where the order of the sequence is determined by the image processing algorithms associated with each subset of images.

\* \* \* \* \*